United States Patent
Mori et al.

(10) Patent No.: US 10,273,993 B2
(45) Date of Patent: Apr. 30, 2019

(54) POSITIONING PIN FOR POSITIONING AND/OR CENTERING A FIRST VEHICLE PART RELATIVE TO A SECOND VEHICLE PART

(71) Applicant: GM GLOBAL TECHNOLOGY OPERATIONS LLC, Detroit, MI (US)

(72) Inventors: Erol Mori, Ruesselsheim (DE); Michael Alhof, Ruesselsheim (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 190 days.

(21) Appl. No.: 15/349,256

(22) Filed: Nov. 11, 2016

(65) Prior Publication Data
US 2017/0159685 A1 Jun. 8, 2017

(30) Foreign Application Priority Data
Nov. 12, 2015 (DE) .................. 10 2015 014 898

(51) Int. Cl.
| F16B 21/00 | (2006.01) |
| F16B 5/06 | (2006.01) |
| B60R 13/02 | (2006.01) |
| B60R 13/04 | (2006.01) |
| F16B 19/02 | (2006.01) |
| B60R 13/01 | (2006.01) |

(52) U.S. Cl.
CPC ........ *F16B 5/0657* (2013.01); *B60R 13/0206* (2013.01); *B60R 13/04* (2013.01); *F16B 19/02* (2013.01); *B60R 2013/018* (2013.01)

(58) Field of Classification Search
CPC ........ F16B 5/0657; F16B 19/02; F16B 19/00; B60R 13/0206; B60R 2013/0293; B60R 2013/018; B62D 65/14

USPC .................................................. 411/351, 945
See application file for complete search history.

(56) References Cited

U.S. PATENT DOCUMENTS

| 3,916,756 A * | 11/1975 | Yoda ...................... F16B 21/073 24/682.1 |
| 3,965,954 A * | 6/1976 | Lofredo ................... F16B 39/04 411/213 |
| 5,297,322 A * | 3/1994 | Kraus .................... F16B 21/073 24/297 |
| 6,416,113 B1 * | 7/2002 | Page ...................... B60J 5/0402 296/146.1 |
| 6,659,701 B1 * | 12/2003 | Risdale ................... F16B 5/065 411/508 |

(Continued)

FOREIGN PATENT DOCUMENTS

| DE | 102007016667 A1 | 10/2008 |
| DE | 102014009257 A1 | 1/2016 |

OTHER PUBLICATIONS

German Patent and Trade Mark Office, Search Report for German Patent Application No. 10 2015 014 898.2 dated Dec. 2, 2016.

*Primary Examiner* — Gary W Estremsky
(74) *Attorney, Agent, or Firm* — Lorenz & Kopf, LLP

(57) ABSTRACT

A positioning device positions and/or centers a first vehicle part relative to a second vehicle part. The device includes a body having a first end connected to the first vehicle part and a second free end in contact with a section formed in the second vehicle part during positioning and/or centering. The section configured to slide along at least two or more sliding surfaces during positioning and/or centering in a phase-wise manner.

5 Claims, 4 Drawing Sheets

(56) References Cited

U.S. PATENT DOCUMENTS

| | | | |
|---|---|---|---|
| 2002/0096912 A1 | 7/2002 | Page | |
| 2004/0155162 A1* | 8/2004 | Schneider | F16B 19/02 248/222.13 |
| 2005/0217088 A1* | 10/2005 | Lin | F16B 5/065 24/458 |
| 2006/0242802 A1* | 11/2006 | Scroggie | B60R 13/0206 24/297 |
| 2008/0260488 A1 | 10/2008 | Scroggie et al. | |
| 2009/0249587 A1* | 10/2009 | Donahue-Yan | B60R 13/0206 24/297 |
| 2011/0067206 A1 | 3/2011 | Senakiewich et al. | |
| 2011/0154621 A1* | 6/2011 | Ehrhardt | B60R 13/0206 24/289 |
| 2013/0014353 A1* | 1/2013 | Loewe | B60R 13/0206 24/292 |
| 2014/0062115 A1* | 3/2014 | Tuomisto | B60R 13/0206 296/1.08 |
| 2014/0298962 A1 | 10/2014 | Morris et al. | |
| 2016/0200265 A1* | 7/2016 | Polovich | B60R 13/04 24/292 |
| 2016/0318470 A1* | 11/2016 | An | B60R 21/205 |

* cited by examiner

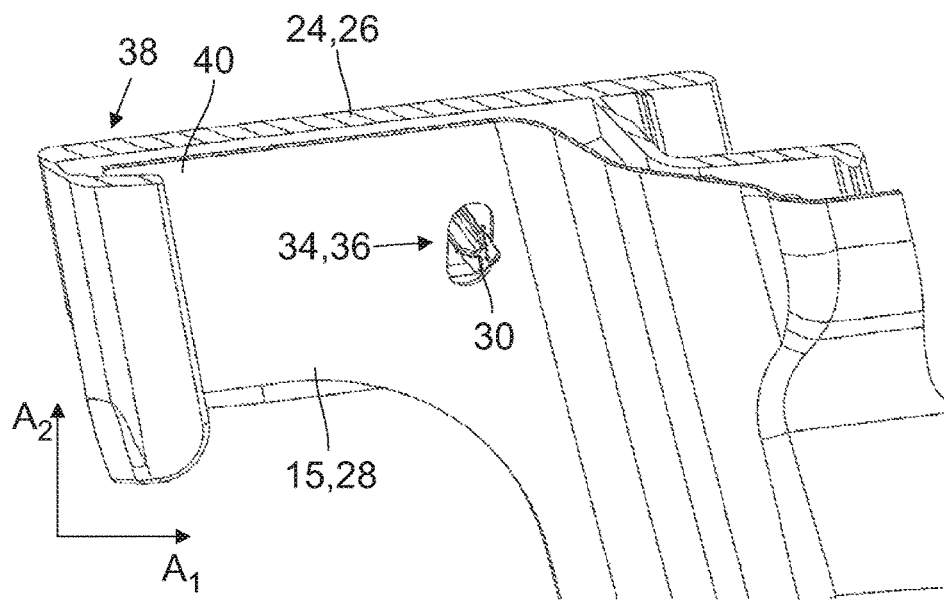
Fig.3a
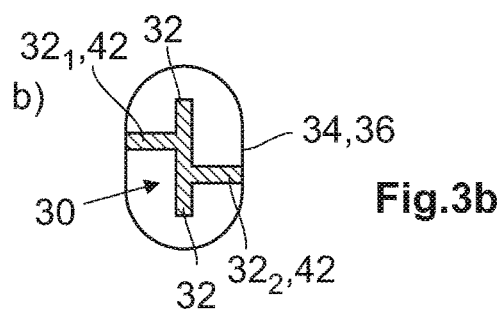
Fig.3b
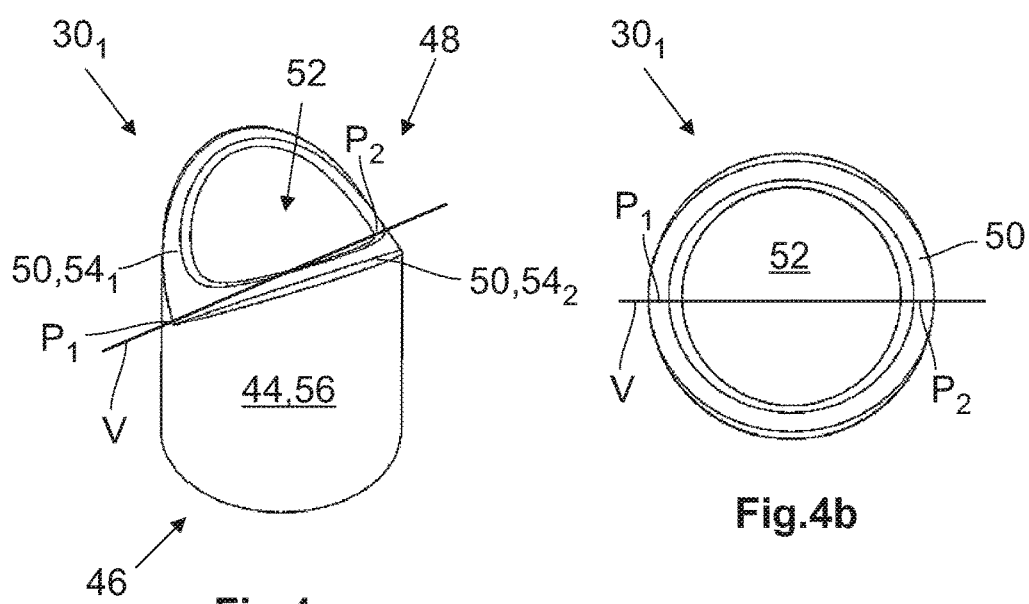
Fig.4a
Fig.4b

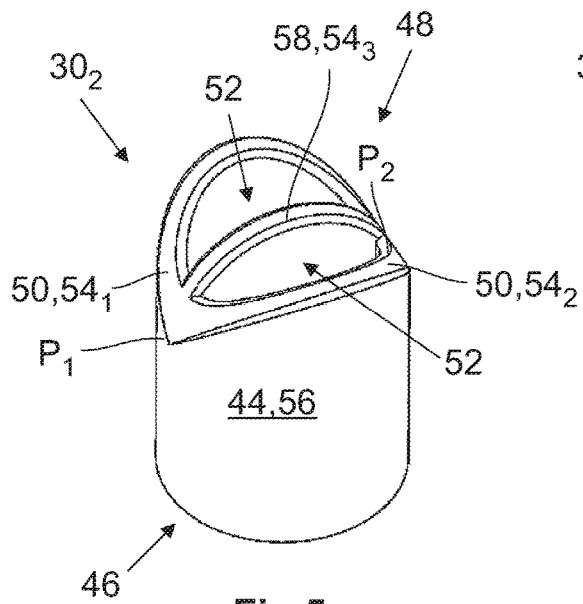
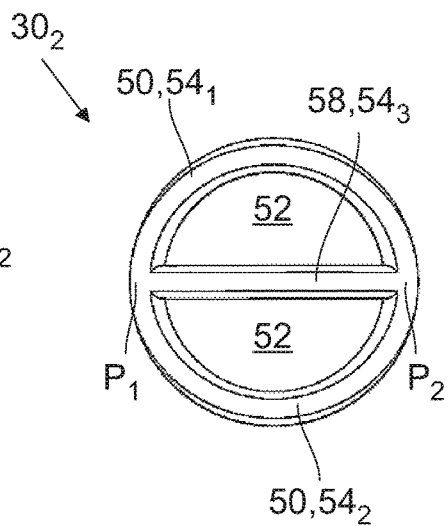
Fig.5a    Fig.5b
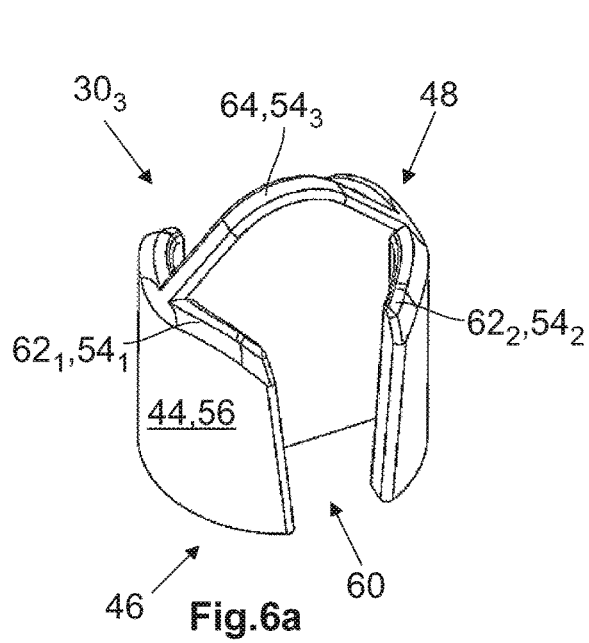
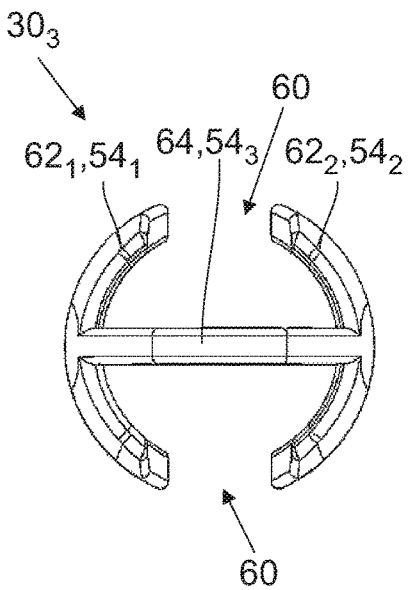
Fig.6a    Fig.6b

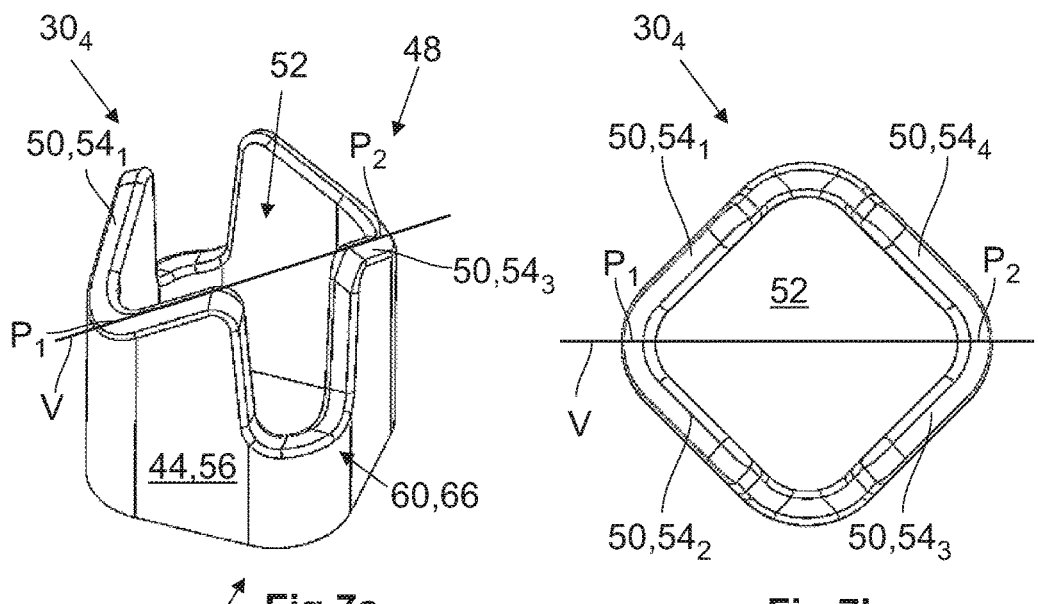
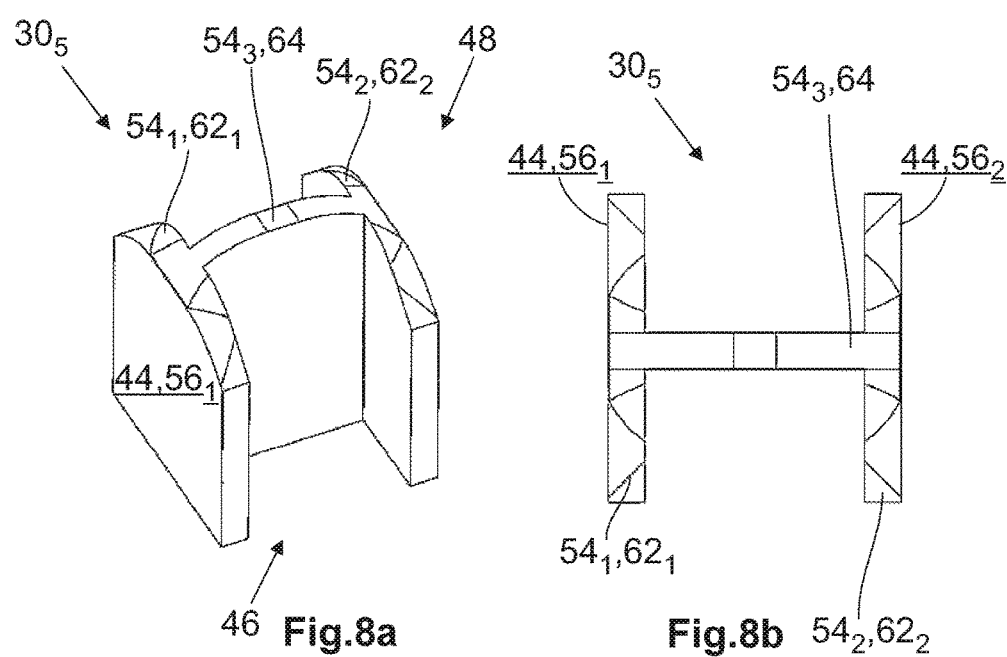

POSITIONING PIN FOR POSITIONING AND/OR CENTERING A FIRST VEHICLE PART RELATIVE TO A SECOND VEHICLE PART

CROSS REFERENCE TO RELATED APPLICATION

This application claims priority to German Patent Application No. 102015014898.2 filed Nov. 12, 2015, which is incorporated herein by reference in its entirety.

TECHNICAL FIELD

The present invention relates to a positioning pin for positioning and/or centering a first vehicle part relative to a second vehicle part.

BACKGROUND

In many cases, two vehicle parts are joined together by means of a screw connection. In order to simplify the manufacture of the screw connection as much as possible, the insertion holes are to some extent oversized in relation to the screws. The oversized insertion hole makes it possible to tighten the screw into the thread even when the vehicle part exhibiting the insertion hole is not positioned exactly in relation to the vehicle part having the thread. Depending on the vehicle parts involved, the inexact positioning can lead to functional limitations and/or a negative aesthetic and qualitative impression. The latter case is encountered in particular for visible vehicle parts, and manifested in an irregular gap width, for example. However, if the objective is to keep assembly simple while at the same time achieving a precise positioning of the two vehicle parts to be joined together, positioning pins are used in addition to the screw connections. For example, the positioning pin is arranged on the first vehicle part, and usually exhibits a conical section to simplify centering and/or positioning. While assembling the vehicle parts, the first vehicle part is moved closer to the second vehicle part. Once a specific distance has been dropped below, the positioning pin interacts with a positioning and/or centering section of the second vehicle part, for example with an edge, a borehole or a recess. In this way, the first vehicle part is centered and positioned relative to the second vehicle part. After the two vehicle parts have been positioned relative to each other, the two vehicle parts can be screwed together.

Conventional positioning pins exhibit a cruciform cross section. The cruciform cross section is arranged in such a way that the positioning and/or centering section glides along only one sliding surface of one of the four cross flanks during assembly. Since the positioning and/or centering section often exhibits sharp edges, in particular given vehicle parts made out of sheet metal, there is a danger that the positioning pins will be severed or broken off while detaching and fastening the two vehicle parts from or to each other, in particular when the worker applies a relatively high pressure to the first vehicle part. As a consequence, the positioning pin can no longer realize its function. For example, it may become necessary to detach and refasten the two vehicle parts in the event of repairs. The more often the two vehicle parts are detached from each other and rejoined with each other, the greater the danger of the positioning pin being broken off or damaged. If the positioning pin fails, the first vehicle part must be changed out completely, so as to ensure that both vehicle parts are precisely positioned relative to each other. This results in an additional expenditure of time and money.

SUMMARY

Therefore, the object of the invention is to indicate a positioning pin that reliably functions even when the affected vehicle parts are repeatedly detached and fastened.

In an exemplary embodiment, the positioning pin according to the invention for positioning and/or centering a first vehicle part relative to a second vehicle part encompasses a base body with a first end, on which the base body can be joined with the first vehicle part, so that the base body forms a free second end in the joined state, wherein the base body comes into contact with a positioning and/or centering section of the second vehicle part at least in the area of the free second end during positioning and/or centering. The base body exhibits two or more sliding surfaces, which are arranged in such a way that the positioning and/or centering section slides along two or more of the sliding surfaces at least in phases during positioning and/or centering. As opposed to the conventional positioning pins, the positioning pin according to the invention exhibits at least two sliding surfaces. The latter are positioned in such a way that at least two sliding surfaces interact with the positioning and/or centering section at least at times or in phases while positioning the two vehicle parts relative to each other. Consequently, the surface pressure is reduced by comparison to known positioning pins, which reduces the danger of the positioning pin being severed, even when the two vehicle parts are repeatedly detached and joined. The result according to the invention is that the two vehicle parts can be repeatedly detached and again joined together without severing or otherwise damaging the positioning pin. The first vehicle part thus need not be changed out, thereby saving on costs and time.

It makes sense that the sliding surfaces be formed by one or more wall sections of the base body. While the basic idea according to the invention is not confined to any specific shape of the base body, it may be advantageous for production-related reasons to provide the base body with wall sections, for example to economize on material. If wall sections are already provided, it makes sense that these wall sections be configured in such a way as to simultaneously comprise the sliding surfaces. This further simplifies the manufacture of the positioning pin according to the invention, since separate parts or an additional step are not required for providing the sliding surfaces.

Another embodiment of the positioning pin is characterized in that the base body exhibits a closed wall section, which envelops a hollow space open toward the free second end. It may be advantageous for production-related reasons not to give the base body a massive design, but rather to provide it with a hollow space. This makes it possible to economize on material on the one hand, but also to simplify the manufacture of the base body in an injection molding process on the other, because there are no accumulations of material. Material accumulations result in uneven cooling in the injection molding process, which can lead to irregularities in the final shape of the base body, and hence to uncontrollable deviations in shape. These deviations in shape can impede the precise positioning of the two vehicle parts relative to each other. While the base body in this embodiment can exhibit a circular, elliptical or parabolic cross section, other shapes are also conceivable, such as polygons.

In a further development of the positioning pin, the base body exhibits a closed wall section, which envelops a hollow space open toward the free second end, wherein one or more additional wall sections are arranged in the hollow space. The wall section or additional wall sections can be used to elevate the geometrical moment of inertia of the base body. This lowers the risk that the positioning pin will become damaged or severed while positioning and fastening the first vehicle part to the second vehicle part. As a result, another contribution is made toward also being able to reliably use the positioning pin according to the invention even given a repeated detachment and fastening of the two vehicle parts.

In addition, the closed wall section and/or other wall sections exhibit one or more apertures. Providing the apertures makes it easier to demold the base body, in particular in the injection molding process. In order to be able to fabricate the hollow space, use is made of a mandrel, over which the base body is molded. In the cooling process, the base body contracts and is shrunk onto the mandrel. As a result, a relatively high force has to be applied to remove the base body from the mandrel. Providing apertures here diminishes the force with which the base body is shrunk onto the mandrel. Consequently, the force required to demold the base body also diminishes. Production is simplified accordingly. For example, the apertures can be realized in the form of holes, openings or recesses.

In another embodiment, the base body exhibits two outer wall sections spaced apart from each other, which are joined together with a third wall section. The outer wall sections spaced apart from each other can be flat or curved. This also simplifies the manufacture of the base body, in particular in the injection molding process, since the spacing between the outer wall sections diminishes the force necessary for demolding. In addition, this shaping can provide an especially high geometrical moment of inertia at a relatively low material consumption, thereby further diminishing the risk of the positioning pin becoming damaged or severed while positioning the two vehicle parts relative to each other.

In particular, it makes sense for the first vehicle part to be a trim panel and the second vehicle part to be a window frame of a vehicle door. For example, trim panels are used to cover the window frame in the area of the B-pillar. The precise positioning of the trim panel on the window frame is of great importance for the qualitative impression made on the user by a correspondingly equipped vehicle. In particular, irregular gap widths between the trim panel and adjoining vehicle parts, such as a glass strip, make an immediate negative impression. Therefore, the positioning pins according to the invention can here be used especially advantageously, since they enable a highly exact positioning of the trim panel in relation to the window frame. Since vehicle doors are damaged relatively frequently during vehicle operation, for example through collision with another vehicle or contact with a stationary object, add-on parts for doors must often be replaced. For this purpose, it may be necessary to disassemble the trim panels to be able to effect repairs. Based on the property of the positioning pin described at the outset, in which an optimal positioning of the trim panel in relation to the window frame can even then be ensured, even after repeated detachment and fastening, the trim panel can be reused clearly more often than would be the case for known trim panels.

Another aspect of the invention relates to a vehicle door for a vehicle, encompassing a window frame and trim panel, wherein the trim panel exhibits a positioning pin according to one of the exemplary embodiments described above. The advantages and technical effects described for the positioning pin according to the invention apply equally to the vehicle door according to the invention. In summation, let reference be made to the possibility of being able to repeatedly detach a trim panel from the window frame of the vehicle door and reattach it thereto with the positioning pin according to the invention, without the positioning pin becoming damaged or severed, and without the ability to precisely position the two vehicle parts relative to each other being lost.

It here makes sense for the positioning and/or centering section of the window frame to be designed as an oblong hole, or encompass an oblong hole. An oblong hole is very easy to fabricate, but can still reliably handle the positioning of the respective vehicle part exactly along the axis of the oblong hole with the smaller extension.

Another aspect of the invention relates to a vehicle with a vehicle door according to one of the embodiments described above. The advantages and technical effects described for the positioning pin according to the invention and the vehicle door according to the invention apply equally to the vehicle according to the invention. In summation, let reference be made to the possibility of being able to repeatedly detach a trim panel from the window frame of the vehicle door and reattach it thereto with the positioning pin according to the invention, without the positioning pin becoming damaged or severed.

Another aspect of the invention relates to a method for positioning and/or centering a first vehicle part relative to a second vehicle part, wherein the first vehicle part encompasses a positioning pin with a base body having a first end at which the base body is joined with the first vehicle part, so that the base body forms a free second end in the joined state, and wherein the base body exhibits two or more sliding surfaces, encompassing the following steps: positioning and/or centering the first vehicle part relative to the second vehicle part in such a way that the base body comes into contact with a positioning and/or centering section of the second vehicle part at least on the area of the free second end, and positioning and/or centering section slides along two or more of the sliding surfaces at least in phases.

The advantages and technical effects described for the positioning pin according to the invention apply equally to the method according to the invention. In summation, let reference be made to the possibility of being able to repeatedly detach a trim panel from the window frame of the vehicle door and reattach it thereto with the positioning pin according to the invention, without the positioning pin becoming damaged or severed.

BRIEF DESCRIPTION OF THE DRAWINGS

The invention will be explained in detail below based on exemplary embodiments, making reference to the attached drawings figures, wherein like numerals denote like elements.

FIG. 3a) is one of the two trim panels depicted on FIG. 2, which is positioned on the window frame by means of a conventional positioning pin;

FIG. 3b) is the conventional positioning pin used on FIG. 3a, based on a principle sectional view perpendicular to the longitudinal axis;

FIG. 4a) is a first exemplary embodiment of a positioning pin according to the invention based on a perspective view;

FIG. 4b) is the positioning pin depicted on FIG. 4a) based on a top view;

FIG. 5a) is a second exemplary embodiment of a positioning pin according to the invention based on a perspective view;

FIG. 5b) is the positioning pin depicted on FIG. 5a) based on a top view;

FIG. 6a) is a third exemplary embodiment of a positioning pin according to the invention based on a perspective view;

FIG. 6b) is the positioning pin depicted on FIG. 6a) based on a top view;

FIG. 7a) is a fourth exemplary embodiment of a positioning pin according to the invention based on a perspective view;

FIG. 7b) is the positioning pin depicted on FIG. 7a) based on a top view;

FIG. 8a) is a fifth exemplary embodiment of a positioning pin according to the invention based on a perspective view; and FIG. 8b) is the positioning pin depicted on FIG. 8a) based on a top view.

BRIEF DESCRIPTION OF THE DRAWINGS

The following detailed description is merely exemplary in nature and is not intended to limit the invention or the application and uses of the invention. Furthermore, there is no intention to be bound by any theory presented in the preceding background of the invention or the following detailed description.

Figure 1:
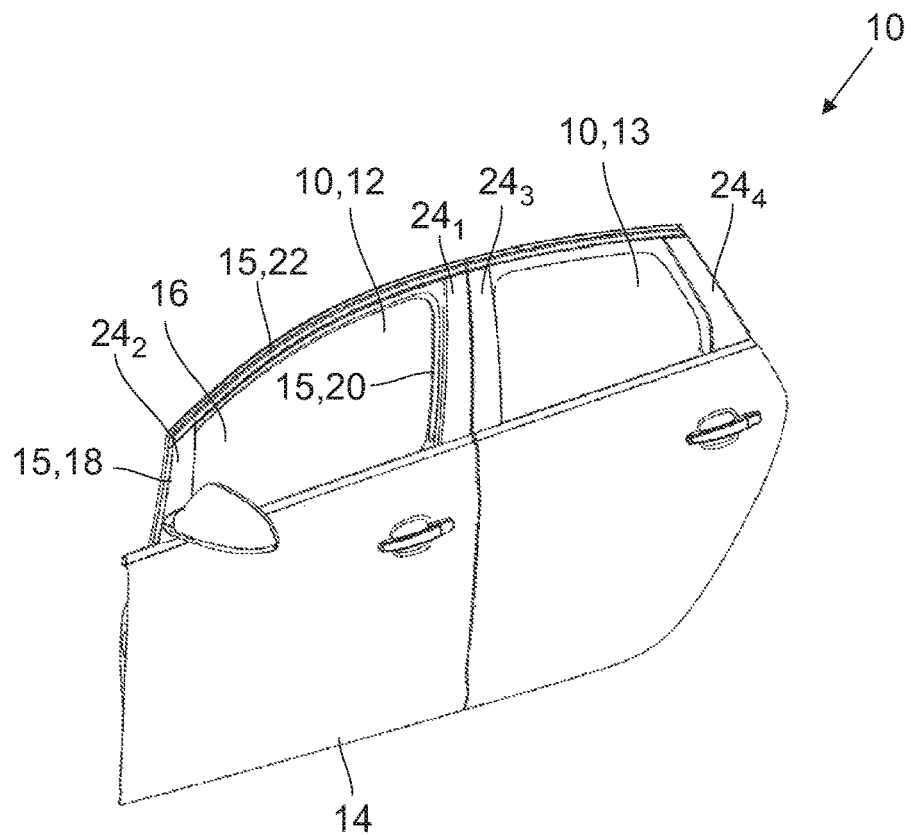
FIG. 1 is a front and rear side door of a vehicle in the mounted state.

FIG. 1 exemplarily illustrates left vehicle doors 10, here one left front side door 12 and one left rear side door 13, in a completely assembled state. The left front side door 12 assembled to the vehicle body of a vehicle (not shown) encompasses a flat base section 14, the upper side of which has molded to it a window frame 15. The window frame 15 here envelops an opening 16 that serves to accommodate a vertically displaceable glass pane (not shown). The window frame 15 encompasses a front high brace 18, a rear high brace 20 and an upper cross brace 22 that joins the latter together. When the front side door 12 has been mounted on the vehicle, the rear high brace 20 typically extends along a support pillar, in particular a center pillar (B-pillar) of the vehicle body. Accordingly, a front high brace of the rear side door 13 also runs along the center pillar of the vehicle body.

During the continued assembly of the side doors, a sealing part is frictionally inserted into a first trim panel 241, with which the glass pane is guided and sealed. In addition to accommodating the sealing part 19, the first trim panel 241 also serves to cover the window frame 15 or sealing part in the area of the rear high brace 20. A second trim panel 242 is provided in the area of the front high brace 18. Accordingly, a third trim panel 243 is provided on the front high brace of the rear door 13, and a fourth trim panel 244 on the rear high brace.

Figure 2:
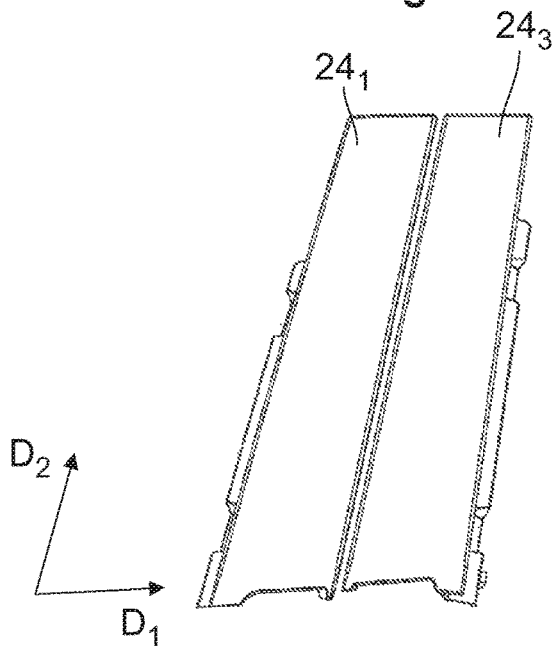
FIG. 2 are two trim panels, which are mounted on the B-pillar of the vehicle depicted on FIG. 1.

FIG. 2 individually depicts the first and third trim panels 241, 243, wherein the alignment of the trim panels 241, 243 corresponds to that on FIG. 1. The trim panels 241, 243 exhibit an essentially trapezoidal surface, wherein they extend in a first direction D1 to clearly less of extent than in a second direction D2.

FIG. 3a) shows how the trim panel 24 configured as a first vehicle part 26 is positioned relative to the window frame 15 as a second vehicle part 28 by means of a positioning pin 30 from prior art. As evident in particular from FIG. 3b), the known positioning pin 30 exhibits a roughly cruciform cross section, and tapers toward the free end. As a result, four cross flanks 32 are present, of which a first cross flank 321 and a second cross flank 322 are offset relative to each other to avoid accumulations of material.

The window frame 15 exhibits a positioning and/or centering section 34 configured as an oblong hole 36 in the example shown. The oblong hole 36 here exhibits a first axis A1 and a second axis A2, wherein the first axis A1 exhibits less of an extension than the second axis A2. In relation to the installed state of the trim panel 24, the second axis A2 of the oblong hole 36 extends essentially parallel to the second direction D2 of the trim panel 24 (see FIG. 2).

Only the first or second cross flank 321, 322 come into contact with the edge of the oblong hole 36 in the centering and positioning process. As a result, the trim panel 24 is only positioned by the oblong hole 36 along the first axis A1 or its first direction D1, with this being intended, however, since the trim panel 24 expands and contracts again clearly more strongly in its second direction D2 than in its first direction D1 owing to temperature fluctuations. The changes in length of the trim panel 24 along the second direction D2 are offset with the depicted alignment of the oblong hole 36.

The trim panel 24 exhibits a U-shaped section 38, which is shoved onto a fastening projection 40 of the window frame 15 while assembling the trim panel 24. The trim panel 24 is then turned toward the window frame. Starting at a specific position of the trim panel 24 relative to the window frame 15, the positioning pin 30 comes into contact with the window frame 15. Due to the tapering of the positioning pin 30, the trim panel 24 is here displaced in relation to the window frame 15 until the positioning pin 30 can engage into the oblong hole 36. The positioning pin 30 is here aligned in such a way that the edge of the oblong hole 36 slides along a sliding surface 42 formed by the first or second cross flank 321, 322, thereby positioning the trim panel 24 in relation to the window frame 15.

As readily visible from FIG. 3a), a certain distance from the fastening projection 40 of the window frame 15 is present in the U-shaped section 38 of the trim panel 24. Consequently, it is entirely possible that the positioning pin 30 will not immediately engage into the oblong hole 36 while turning the trim panel 24 toward the window frame 15, with a more or less large displacement of the trim panel 24 relative to the window frame 15 instead first being required. If too great a pressure is here exerted on the trim panel 24 by the assembly worker, it can easily happen that the positioning pin 30 will break off, or be severed or damaged due to the high surface pressure on the sliding surface 42 applied by the usually sharp edge of the window frame 15.

FIG. 4a) shows a first exemplary embodiment of the positioning pin 301 according to the invention based on a perspective view. FIG. 4b) presents a top view of the positioning pin 301 shown on FIG. 4a). The positioning pin 301 exhibits a base body 44 with a first end 46 and a free second end 48. The first end 46 of the base body 44 is joined with a first vehicle part 26, here with the trim panel 24 (not shown). The trim panel 24 and positioning pin 301 can here be configured as an integral component. In a first exemplary embodiment, the base body 44 exhibits a closed wall section 50, so that the base body 44 has an annular cross section. The base body 44 envelops a hollow space 52, which is open toward the free end 48. In the area of the free end 48, the base body 44 comes into contact with the positioning and/or centering section 34 of the window frame 15 while centering the trim panel 24 in relation to the window frame 15. The free second end 48 of the wall section 50 is shaped roughly like a saddle, which in projection forms a half-sphere. The wall section 50 forms a first and second sliding surface 541, 542, which converge in the two lowest points P1, P2 of the free second end 48. The base body 44 is arranged on the trim panel 24 in such a way that, while positioning the trim panel 24 relative to the window frame 15, the positioning pin 30 comes into contact with the positioning and/or centering section 34 of the window frame 15, in this case with the edge of the oblong hole 36, with both sliding surfaces 541, 542. In other words, a connecting line V runs between the two lowest points P1, P2 essentially parallel to the first axis A1 of the oblong hole 36, and to the first direction D1 of the trim panel 24. As a result, the surface pressure is reduced, since the forces at work during the positioning process are distributed to the two sliding surfaces 541, 542. This clearly diminishes the risk of the positioning pin 30 becoming severed by the sharp edge of the oblong hole 36 during assembly.

After the trim panel 24 in the area of the free second end 48 has been positioned in relation to the window frame 15, the edge of the oblong hole 36 exits the sliding surfaces 541, 542, and comes into contact with an outer surface 56 of the base body 44. Since the annular cross section of the base body 44 gives it an elevated resistance torque against bending and an elevated geometrical moment of inertia by comparison with the positioning pin 30 shown on FIGS. 3a) and 3b), the danger that the positioning pin 301 will break while assembling the trim panel 24 clearly diminishes.

FIG. 5a) shows a second exemplary embodiment of the positioning pin 302 according to the invention based on a perspective view, and FIG. 5b) based on a top view. In the second exemplary embodiment, the positioning pin 302 essentially corresponds to the positioning pin 301 depicted on FIGS. 4a) and 4b), although the positioning pin 302 according to the second exemplary embodiment exhibits another wall section 58, which extends through the center axis of the tubular wall section 50, and runs along the first axis A1 of the oblong hole 36 and the first direction D1 of the trim panel 24, thereby forming two hollow spaces 52. Three sliding surfaces 541, 542, 543 are present in this case, along which the edge of the oblong hole 36 can slide while positioning the trim panel 24. Consequently, the surface pressure is further reduced. In addition, the geometrical moment of inertia and resistance moment against bending the base body 44 are further increased by comparison to the first exemplary embodiment 301. As a consequence, the danger of the positioning pin 302 being broken or severed during the centering process is further reduced.

FIG. 6a) shows a third exemplary embodiment of the positioning pin 303 according to the invention based on a perspective view, and FIG. 6b) based on a top view. The base body 44 is essentially identical in structural design to the one in the second exemplary embodiment of the positioning pin 302 depicted on FIG. 5a) and FIG. 5b), although the base body 44 exhibits an aperture 60 that extends from the first end 46 until the free second end 48, thereby forming two outer wall sections 621, 622, which are joined together with a third wall section 64. The two outer wall sections 621, 622 are curved, while the third wall section 64 is flat. Three sliding surfaces 541, 542, 543 are formed in this case as well, wherein the edge of the oblong hole 36 first slides along the central sliding surface 543, and only later gets onto the sliding surfaces 541, 542, which are formed by the two outer wall sections 621, 622. In this respect, the edge of the oblong hole 36 in this case only slides along two or more sliding surfaces 541, 542, 543 at times or in phases.

FIG. 7a) shows a fourth exemplary embodiment of the positioning pin 304 according to the invention based on a perspective view, and FIG. 7b) based on a top view. The base body 44 exhibits a wall section 50 with an essentially annular cross section, but also having flat sections, so that the wall section 50 envelops an essentially square hollow space 52. The wall section 50 exhibits two apertures 60, which in this example are configured as recesses 66, and consequently do not extend all the way to the first end 46. Four sliding surfaces 541 to 544 are formed as a result, of which a respective two sliding surfaces 541, 542 and 543, 544 converge at their lowest points P1, P2. The connecting line V running through the two lowest points P1, P2 is here aligned in such a way as to run parallel to the first axis A1 of the oblong hole 36 and the first direction D1 of the trim panel 24. While centering the trim panel 24, the edge of the oblong hole 36 slides along two sliding surfaces 541, 542 or 543, 544, until it abuts against the outer surface 56 of the base body 44.

FIG. 8a) shows a fifth exemplary embodiment of the positioning pin 305 according to the invention based on a perspective view, and FIG. 8b) based on a top view. The base body 44 exhibits two outer wall sections 621, 622 and a third wall section 64, which joins together the two outer wall sections 62. The positioning pin 30 is here arranged on the trim panel 24 in such a way that the third wall section 64 runs along the first axis A1 of the oblong hole 36 and the first direction D1 of the trim panel 24. The two outer wall sections 621, 622 and also the third wall section 64 are here flat in design, so that the base body 44 yields a double T cross section, and consequently exhibits a very high geometrical moment of inertia and a very high resistance moment against bending. While the trim panel 24 is being assembled to the window frame 15, the edge of the oblong hole 36 only slides along the center sliding surface 543 until it comes into contact with the sliding surface 541 or 542 of one of the outer wall sections 621, 622. Since the outer wall sections 621, 622 are flat, the straight section of the edge of the oblong hole 36 abuts against the outer surfaces 561, 562 of the outer wall sections 621, 622 after exiting the sliding surfaces 541, 542. Since the outer surfaces 561, 562 are flat, the surfaces come into contact, so that the surface pressure between the oblong hole 36 and the outer surfaces 561, 562 is clearly reduced by comparison to the remaining embodiments. Consequently, the risk of the positioning pin 30 becoming severed is further reduced.

Even though the invention has been described based upon at least one exemplary embodiment, it is understood that a plurality of variants exists. It should also be noted that certain basis and also embodiment or the exemplary embodiments are only examples, and not meant to limit the protective scope, applicability or implementability or structural design in anyway. The above specification provides the expert with a suitable instruction for executing or implementing at least one embodiment; it goes without saying that various changes can be made to the function and arrangement of elements or components described above in at least one exemplary embodiment without deviating from the protective scope of the following claims and their legal equivalents.

The invention claimed is:

1. A positioning pin for positioning a first vehicle part relative to a second vehicle part comprising:
    a base body having at least two sliding surfaces and a first end configured to join the base body with the first vehicle part such that the base body forms a free second end in a joined state with the first vehicle part, the base body comprising a closed wall section enveloping a hollow space open toward the free second end, wherein at least one additional wall section is arranged in the hollow space, the additional wall section comprising at least one aperture, wherein each sliding surface comprises at least one wall section of the base body;

a positioning section of the second vehicle part contacting the base body at least in an area of the free second end during relative positioning of the base body and the second vehicle part, wherein the positioning section is configured to slide along the at least two sliding surfaces during the relative positioning, wherein the at least two sliding surfaces form an upper edge of the base body, the upper edge of the base body having a substantially saddle shape.

2. The positioning pin according to claim 1, wherein the base body comprises two outer wall sections spaced apart from each other and joined together with a third wall section.

3. A vehicle door for a vehicle, comprising a window frame and a trim panel, wherein the trim panel includes a positioning pin according to claim 1.

4. A vehicle comprising a vehicle door according to claim 3.

5. A vehicle door for a vehicle, comprising:
a window frame; and
a trim panel comprising a positioning pin for positioning a first vehicle part relative to a second vehicle part, the positioning pin comprising:
a base body having at least two sliding surfaces and a first end configured to join the base body with the first vehicle part such that the base body forms a free second end in a joined state with the first vehicle part, the base body comprising a closed wall section enveloping a hollow space open toward the free second end, wherein at least one additional wall section is arranged in the hollow space, the additional wall section comprising at least one aperture, wherein each sliding surface comprises at least one wall section of the base body;
a positioning section of the second vehicle part contacting the base body at least in an area of the free second end during relative positioning of the base body and the second vehicle part, wherein the positioning section is configured to slide along the at least two sliding surfaces during the relative positioning,
wherein the positioning section of the window frame comprises an oblong hole.

* * * * *